C. J. TRAVERS.
REVOLVING CHAIR.
APPLICATION FILED JULY 24, 1916.
1,230,239.
Patented June 19, 1917.
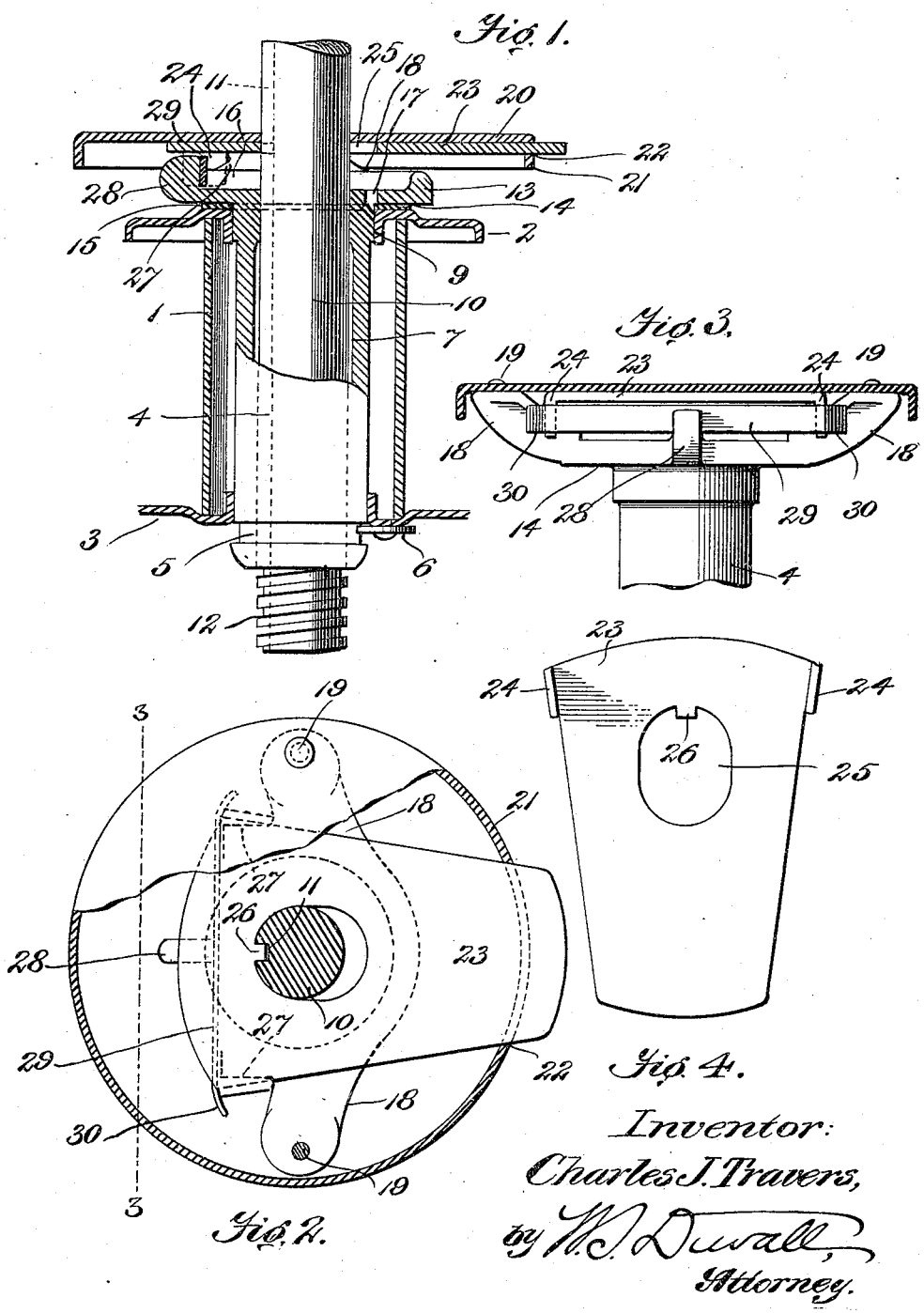

UNITED STATES PATENT OFFICE.

CHARLES J. TRAVERS, OF MILWAUKEE, WISCONSIN.

REVOLVING CHAIR.

1,230,239.  Specification of Letters Patent.  Patented June 19, 1917.

Application filed July 24, 1916. Serial No. 110,848.

*To all whom it may concern:*

Be it known that I, CHARLES J. TRAVERS, a citizen of the United States, residing at Milwaukee, in the county of Milwaukee and State of Wisconsin, have invented new and useful Improvements in Revolving Chairs, of which the following is a specification.

This invention relates to improvements in revolving chairs, especially to that part thereof usually termed the "iron" and serving to support the chair-seat adjustably upon the base.

The objects of the present invention are to provide an efficient means for positively and automatically locking the threaded and supporting standard to the swiveled sleeve, whereby the two are caused to swivel or revolve together as the chair-seat revolves, and for unlocking the same for vertical adjustment of the supporting-standard and seat when desired.

Other minor objects of the invention will hereinafter appear, and the novel features thereof will be more particularly pointed out in the appended claims.

Referring to the drawing:

Figure 1 is a vertical transverse sectional view of a chair-iron embodying my invention, the chair-base being omitted, with the exception of the hub, and the upper part of the threaded supporting-standard broken off;

Fig. 2 is a top plan view of the same, the hub omitted and a hand-wheel partly broken away to expose the parts immediately beneath;

Fig. 3 is a transverse sectional view on the line 3—3 of Fig. 2; and,

Fig. 4 is a detail of the lock-plate.

Similar numerals of reference indicate similar parts in all the figures of the drawing.

The hub, it will be understood, may be of any construction and design, as the same forms no part of my present invention. In this instance, however, I have illustrated the invention with one of the well-known conventional forms of hub formed of sheet-metal, in which 1 designates the intermediate tubular body-portion, and 2 and 3 the upper and lower flanges respectively to which said body-portion is connected.

The hub is formed with a central bore, as is usual, and within the same there is mounted for rotation the sleeve 4. The sleeve is usually provided near its lower end with an external groove 5, into which some character or fastening device, as a latch 6, may be engaged to lock the sleeve in position within the hub and against accidental withdrawal. The sleeve is bored throughout its length, as at 7, and at the lower end of the bore is a short section of threads. At its upper end, the bore of the sleeve is slightly reduced, forming an annular bearing 9, and in the bearing and engaging the threads of the bore is the usual adjustable supporting-post or screw 10. This post is preferably grooved throughout its length, as at 11, and threads 12, are formed near the lower portion of the same.

At its upper end, above the hub, the sleeve is provided with an enlarged annular external head 13, the underside of which forms an annular bearing 14, adapted to rotate upon the upper end of the hub or upon, as in this instance, an anti-wear washer 15, preferably formed of fiber. The head is further provided with a cavity 16, which, as will hereinafter appear, constitutes a reservoir for a lubricant, and may have a lubricant-discharge 17.

Short inclined standards 18, may radiate from the head at points a suitable distance apart, said standards terminating in a horizontal plane slightly above the head, at which point they may be secured by rivets 19, to the underside of a convenient hand-wheel 20. The wheel 20 is preferably formed of sheet-steel and with a surrounding depending flange 21, which, at a point between the standards 18, may have a narrow slot 22.

Mounted to slide in the space formed by the standards between the hand-wheel and the head of the sleeve, is the locking-plate 23, the same being slightly wedge-shaped, preferably and provided at its rear wider end with depending ears 24, and between and slightly in advance of the same with a slightly elongated opening 25, the narrowest width of the latter being but slightly larger than the diameter of the supporting-standard which it receives and approximates. At the rear end of the elongated opening 25 there is formed a locking-lug 26, the same being positioned and proportioned so as to engage with the longitudinal groove of the supporting standard.

The depending ears of the locking-plate depend in rear of the short standards of the head and therefore engage the same. Between the short standards of the head, the latter is cut away on a tangent, thereby forming at the inner rear side of each of the short standards guides 27, which are embraced by the depending ears of the locking-plate. Midway these guides, the enlarged head is formed with an upwardly disposed lug 28, which is positioned between the depending ears of the locking-plate and extends upwardly about in the same horizontal plane as the same.

Having its middle bearing against the lug 28 and its terminals sprung over the rear edges of the depending ears of the locking-plate, is a flat spring 29, the ends of which, at points beyond said ears, are preferably bent, as at 30, so as to engage the latter.

The narrow slot formed in the depending flange of the hand-wheel about approximates in length the width of the locking plate at the front end of the latter, so that when the parts indicated are in position, the front end of the locking-plate extends through and a slight distance beyond said slot, in which position it is held by the tension of the aforesaid spring. The edges of the locking-plate are in contact with the ends of the slot, and the opposite sides of the opening in the locking-plate are in contact with the side of the adjusting-standard, while the lug of the locking-plate is in engagement with the groove of the standard. Thus it will be apparent that these three points of contact will offer a combined resistance to separation during the swiveling movements of the chair in either direction.

The locking-plate may and preferably is, struck up from sheet-steel, though it may be cast if preferred.

The operation of the invention will be appreciated and comprehended from the foregoing description, it being apparent that normally, the parts are locked in the manner described and that the chair may be rotated freely, the hand-wheel, locking-plate, and sleeve rotating with the adjustable standard. When, however, it is desired to raise or lower the chair-seat, and, therefore, raise or lower the adjusting-standard in the threads of the sleeve, the locking-plate is pushed inward, preferably by hand, so as to become disengaged from the adjusting-standard, and is held in this unlocked position while the seat and standards are rotated so as to elevate or depress the former to the desired height, after which, the locking-plate is released and the parts resume their normal locked position.

The cavity formed in the enlarged head of the sleeve will serve as a storage place for a suitable lubricant, the latter best being introduced into the cavity during the assembling of the parts. This lubricant will gradually work its way through the small orifice 17, with which the cavity 16, is provided, to the bearing between the upper end of the hub and the underside of the enlarged head of the sleeve and from thence to the threads of the adjusting-standard, so that a constant lubrication takes place.

It is evident that I may substitute other forms of springs for the form shown, it being within the purview of my invention to employ any form of spring or rubber cushion that will normally lock the plate with the adjusting standard.

Having described my invention, what I claim, is:

1. In a chair-iron, the combination with a revoluble sleeve, standards extending upwardly therefrom, and a hand-wheel secured to the standards above the upper end of the sleeve and having an opening alining with that of the sleeve, of a grooved adjusting-standard threaded in the sleeve and extending through the opening in the hand-wheel, a movable locking-plate between the hand-wheel and sleeve having an opening receiving the adjusting-standard, said locking-plate having one edge of its opening provided with a locking-lug for engaging the groove of the adjusting-standard and its opposite rear corners provided with depending ears engaging the standards of the sleeve, a lug formed on the upper end of the sleeve and positioned between said ears of the locking-plate, and a flat spring bearing at its middle against the lug of the sleeve and at its opposite terminals against the rear edges of the ears of the locking-plate.

2. In a chair-iron, the combination with a revoluble sleeve, standards extending upwardly therefrom and provided with opposite guides, and a lug formed on the upper end of the sleeve between said guides, of a hand-wheel having an opening alining with the opening in the sleeve and secured to the standards, a longitudinally grooved, adjusting-standard threaded in the sleeve and extending through the opening in the hand-wheel, a reciprocating locking-plate located between the hand-wheel and the upper end of the sleeve and provided at its rear corners with depending ears engaging the opposite guides of the standards and having an opening receiving the adjusting-standard and formed with a lug for engaging the longitudinal groove thereof, and a flat spring bearing near its middle against the lug of the sleeve and having its opposite terminals engaging the depending ears of the locking-plate.

3. In a chair-iron, the combination with a revoluble sleeve terminating at its upper end in an enlarged annular head provided with a cavity adapted to receive a lubricant and having the wall of the cavity provided with an orifice leading to the underside or bearing-portion of said head, whereby a stored lubricant will be fed to said bearing-portion, of an adjusting-standard threaded in the sleeve and having a longitudinal groove, a hand-wheel surmounting the sleeve and adapted to move therewith, and means for removably locking the sleeve and adjusting-standard.

4. In a chair-iron, the combination with a revoluble sleeve terminating at its upper end in an enlarged head from the opposite sides of which rise short standards and between the latter a lug, and a hand-wheel fastened to the standards and provided with a depending peripheral flange provided with a narrow slot, of an adjusting-standard longitudinally grooved and threaded in the sleeve, a wedge-shaped locking plate mounted to reciprocate between the standards and between the hand-wheel and the upper end of the sleeve, the outer end of said locking-plate approximating the narrow slot of the hand-wheel and projecting through and beyond the same and in rear of said slot having an opening approximating the diameter of the adjusting-standard and elongated in one direction and provided with a locking-lug engaging the groove of the standard and at its rear opposite sides having depending ears, and a flat spring bearing intermediate its ends against the lug of the sleeve and at its terminals against the depending ears of the locking-plate, whereby the latter is normally forced against the rear edges of the standards and the locking-lug of the plate is in engagement with the groove of the adjusting-standard.

5. In a chair-iron, the combination with a revoluble sleeve terminating at its upper end in a head, and a hand-wheel secured rigidly to and spaced from said sleeve, of an adjusting-standard longitudinally grooved and threaded in the sleeve, opposite stops and an intermediate lug extending upwardly from the head, a locking-plate located in the space between the hand-wheel and the upper end of the sleeve and provided at opposite sides with depending ears adapted to engage with the opposite stops of the head, said plate having an opening slightly elongated and receiving the adjusting-standard and at its edge having a locking-lug adapted to engage the groove of the adjusting-standard, and a flat spring bearing at an intermediate point against the lug of the head and at its terminals against the ears of the locking-plate.

6. In a chair-iron, the combination with a revoluble sleeve terminating at its upper end in a head, and a hand-wheel secured rigidly to and spaced from said sleeve, of an adjusting-standard longitudinally grooved and threaded in the sleeve, opposite stops having guides disposed at an angle thereto and an intermediate lug formed on the upper end of the head, a hand-wheel located between the hand-wheel and the head and at its opposite rear corners provided with depending ears for engaging the stops and guides, said plate being further provided with a slightly elongated opening having a locking-lug, said opening receiving the adjusting-standard and the lug engaging the groove thereof, and a flat spring bearing at an intermediate point against the front of the lug of the head and at its terminals bearing against the rear edges of the ears of the locking-plate.

7. In a chair-iron, the combination with a revoluble sleeve, standards extending upwardly therefrom, and a hand-wheel secured rigidly to the standards and provided with an opening alining with the bore of the sleeve, of a grooved adjusting-standard threaded in the sleeve, a movable locking-plate having an elongated opening receiving the adjusting-standard, said opening being provided with a locking-lug adapted to engage and interlock with the groove of the adjusting-standard, and a spring for normally causing the lug of said plate to interlock with said adjusting-standard.

8. In a chair-iron, the combination with a revoluble sleeve, standards extending upwardly therefrom and provided with guides, and a hand-wheel having an opening alining with the bore of the sleeve, said wheel being secured rigidly with the standards, of a reciprocating locking-plate between the hand-wheel and sleeve, said plate being provided at its opposite rear corners with depending ears engaging the guides of the standards, and further provided with an elongated opening for receiving the adjusting-standard, said opening having a lug at its rear side, a grooved adjusting-standard passing through the hand-wheel and plate and threaded in the sleeve, and a spring for normally forcing the plate forward whereby its lug engages the groove of said adjusting-standard.

In testimony whereof I have signed my name to this specification in the presence of two subscribing witnesses.

CHARLES J. TRAVERS.

In the presence of—
JOHN G. PETERSON,
GEO. W. TRAVERS.

Copies of this patent may be obtained for five cents each, by addressing the "Commissioner of Patents, Washington, D. C."